(12) United States Patent
Calundann et al.

(10) Patent No.: US 7,696,302 B2
(45) Date of Patent: Apr. 13, 2010

(54) HIGH-MOLECULAR-WEIGHT POLYAZOLES

(75) Inventors: Gordon Calundann, North Plainfield, NJ (US); Oemer Uensal, Mainz (DE); Brian Benicewicz, Loudonville, NY (US); Bobby G. Dawkins, Charlotte, NC (US); J. Dean Baker, Rock Hill, SC (US); Rita H. Joiner, Rock Hill, SC (US)

(73) Assignee: PBI Performance Products, Inc., Charlotte, NC (US)

( * ) Notice: Subject to any disclaimer, the term of this patent is extended or adjusted under 35 U.S.C. 154(b) by 1000 days.

(21) Appl. No.: 10/538,190

(22) PCT Filed: Dec. 2, 2003

(86) PCT No.: PCT/EP03/13529

§ 371 (c)(1), (2), (4) Date: May 18, 2006

(87) PCT Pub. No.: WO2004/055097

PCT Pub. Date: Jul. 1, 2004

(65) Prior Publication Data
US 2008/0119634 A1 May 22, 2008

(30) Foreign Application Priority Data
Dec. 16, 2002 (DE) .................. 102 58 580

(51) Int. Cl.
*C08G 73/18* (2006.01)
*C08G 73/22* (2006.01)
*C08G 73/00* (2006.01)
*C08G 73/06* (2006.01)

(52) U.S. Cl. .................. 528/363; 528/424; 528/491; 528/502 R; 528/503

(58) Field of Classification Search .................. 528/363, 528/424, 491, 502 R, 503
See application file for complete search history.

(56) References Cited

U.S. PATENT DOCUMENTS

| | | | |
|---|---|---|---|
| 375,262 A | 12/1887 | Covey et al. | |
| 448,687 A | 3/1891 | Stanley et al. | |
| 3,737,042 A | 6/1973 | Boom | |
| 3,841,492 A | 10/1974 | Brinegar | |
| 4,154,919 A | 5/1979 | Sheratte | |
| 4,191,618 A | 3/1980 | Coker et al. | |
| 4,212,714 A | 7/1980 | Coker et al. | |
| 4,333,805 A | 6/1982 | Davidson et al. | |
| 4,512,894 A | 4/1985 | Wang | |
| 4,533,725 A | 8/1985 | Choe et al. | |
| 4,535,144 A | 8/1985 | Choe et al. | |
| 4,693,815 A | 9/1987 | Collins, Jr. | |
| 4,693,824 A | 9/1987 | Sansone | |
| 5,091,500 A | 2/1992 | Lysenko et al. | |

FOREIGN PATENT DOCUMENTS

| | | |
|---|---|---|
| DE | 10052237 A1 | 8/2002 |
| EP | 0122735 | 10/1984 |
| EP | 0177182 | 4/1986 |
| EP | 0476560 A1 | 3/1992 |
| GB | 1422177 | 1/1976 |
| JP | 4635860 | 10/1971 |
| WO | WO 84/01162 | 3/1984 |
| WO | WO 98/14505 A1 | 4/1998 |

*Primary Examiner*—Duc Truong
(74) *Attorney, Agent, or Firm*—Hammer & Associates, P.C.

(57) ABSTRACT

The invention under consideration concerns novel high-molecular-weight polyazoles, which are suitable for the production of fibers, films, membranes, and molded articles, on the basis of their high molecular weight, expressed as intrinsic viscosity, of at least 1.3 dl/g. Moreover, the invention under consideration describes a method for the production of high-molecular-weight polyazoles.

18 Claims, No Drawings

US 7,696,302 B2

HIGH-MOLECULAR-WEIGHT POLYAZOLES

The invention under consideration concerns novel high-molecular-weight polyazoles, a method for their production, and their use.

Polyazoles, such as polybenzimidazoles ($^R$Celazole), have been known for a long time. The production of such polybenzimidazoles (PBI) usually takes place by reacting 3,3',4,4'-tetra-aminobiphenyl with isophthalic acid or diphenyl isophthalate or their esters in the melt. In the reaction with DPIP, gaseous phenol is formed as a secondary product, which leads to a strong formation of foam and volume expansion. The formed prepolymer solidifies in the reactor and is subsequently comminuted mechanically. The powdery prepolymer is then end-polymerized in a solid phase polymerization at temperatures of up to 400° C., and the desired polybenzimidazoles are obtained.

For the production of polymer films or polymer fibers, the PBI is dissolved in another step in polar, aprotic solvents, such as dimethyl acetamide (DMAc), and a film or a fiber is produced by means of classical methods.

In the production of the solutions, it has been shown that they depend greatly on the characteristics of the polyazole used. In particular, the observed gel formations and other crystallization effects lead to a low storage capacity of the solutions. These problems have already been described in German Patent Application No. 10052237.8. The procedure described there, however, is very expensive and leads to a poor yield of the polyazole polymers used.

The goal of the invention under consideration is to prepare a polyazole, which overcomes the preceding problems and, on the other hand, exhibits excellent physical characteristics.

It was then discovered that high-molecular-weight polyazoles, on the one hand, lead to the formation of storage-stable solutions and, on the other hand, even surpass the excellent physical characteristics of previously known polyazoles. The high-molecular-weight polyazoles are, moreover, prepared in a simple manner.

The objective of the invention under consideration refers to polyazoles whose molecular weights, measured as intrinsic viscosity, is at least 1.3 dl/g, obtainable by a method consisting of the following steps:

A) mixing one or more aromatic tetra-amino compounds with one or more aromatic carboxylic acids or its esters, which contain at least two acid groups per carboxylic acid monomer, or mixing one or more aromatic and/or heteroaromatic diaminocarboxylic acids;

B) heating the mixture obtainable according to step B) under inert gas, to temperatures of up to 350° C., preferably up to 300° C.;

C) comminution of the composition obtained according to step B) and fractionation of the particles obtained;

D) heating the particle fraction of 300 μm to 1000 μm under an inert gas, to temperatures of up to 450° C., preferably up to 400° C., and cooling.

The aromatic and heteroaromatic tetra-amino compounds, used in accordance with the invention, are preferably 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane, and their salts, in particular, their mono-, di-, tri-, and tetrahydrochloride derivatives.

The aromatic carboxylic acids used, in accordance with the invention, are dicarboxylic acids or its esters, or its anhydrides or its acid chlorides. The term "aromatic carboxylic acids" equally comprises heteroaromatic carboxylic acids as well. Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-arboxyphenyl)hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the invention, are heteroaromatic dicarboxylic acids or their esters or their anhydrides. The "heteroaromatic dicarboxylic acids" include aromatic systems that contain at least one nitrogen, oxygen, sulfur, or phosphorus atom in the ring. Preferably, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides.

The aromatic and heteroaromatic diaminocarboxylic acid used in accordance with the invention is preferably diaminobenzoic acid and its mono- and dihydrochloride derivatives.

Preferably, mixtures of at least 2 different aromatic carboxylic acids are used in step A). With particular preference, mixtures that, in addition to aromatic carboxylic acids, also contain heteroaromatic carboxylic acids are used. The mixture ratio of aromatic carboxylic acids to heteroaromatic carboxylic acids is between 1:99 and 99:1, preferably, 1:50 to 50:1.

These mixtures are, in particular, mixtures of N-heteroaromatic dicarboxylic acids and aromatic dicarboxylic acids or their esters. Non-limiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. Preferably, it is diphenyl isophthalate (DPIP) and its ester.

The polymers formed in accordance with the invention, on the basis of polyazole, contains recurring azole units of general formula (I) and/or (II) and/or (III) and/or (IV) and/or (V) and/or (VI) and/or (VII) and/or (VIII) and/or (DC) and/or (X):

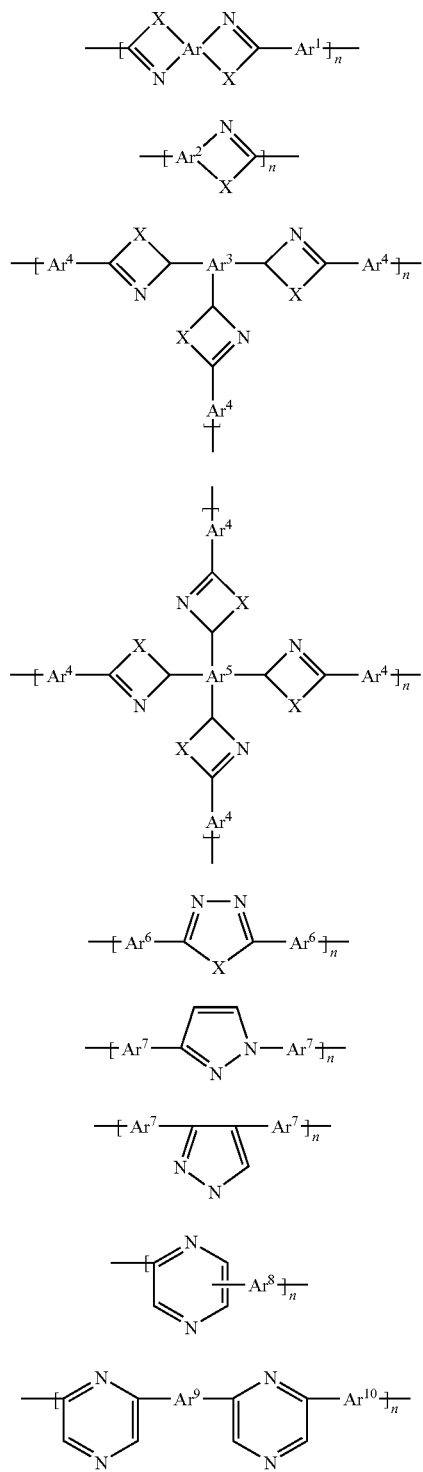

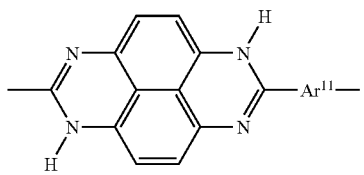

wherein

Ar are the same or different and [stand] for a tetravalent, aromatic, or heteroaromatic group, which can be mononuclear or multinuclear;

$Ar^1$ are the same or different and [stand] for a divalent aromatic or heteroaromatic group, which can be mononuclear or multinuclear;

$Ar^2$ are the same or different and [stand] for a divalent or trivalent aromatic or heteroaromatic group, which can be mononuclear or multinuclear;

$Ar^3$ are the same or different and [stand] for a trivalent aromatic or heteroaromatic group, which can be mononuclear or multinuclear;

$Ar^4$ are the same or different and [stand] for a trivalent aromatic or heteroaromatic group, which can be mononuclear or multinuclear;

$Ar^5$ are the same or different and [stand] for a tetravalent aromatic or heteroaromatic group, which can be mononuclear or multinuclear;

$Ar^6$ are the same or different and [stand] for a divalent aromatic or heteroaromatic group, which can be mononuclear or multinuclear;

$Ar^7$ are the same or different and [stand] for a divalent aromatic or heteroaromatic group, which can be mononuclear or multinuclear;

$Ar^8$ are the same or different and [stand] for a trivalent aromatic or heteroaromatic group, which can be mononuclear or multinuclear;

$Ar^9$ are the same or different and [stand] for a divalent or trivalent aromatic or heteroaromatic group, which can be mononuclear or multinuclear;

$Ar^{10}$ are the same or different and [stand] for a divalent or trivalent aromatic or heteroaromatic group, which can be mononuclear or multinuclear;

$Ar^{11}$ are the same or different and [stand] for a divalent aromatic or heteroaromatic group, which can be mononuclear or multinuclear;

X is the same or different and [stands] for oxygen, sulfur, or an amino group, which carries a hydrogen atom, a group with 1-20 carbon atoms, preferably, a branched or non-branched alkyl or alkoxy group, or an aryl group as an additional radical;

n is a whole number greater than [or] equal to 10, preferably greater than [or] equal to 100.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzo-oxathiadiazole, benzo-oxadiazole, benzopyridine, benzopyrazine, benzopyrazidine, benzopyrnmidine, benzopyrazine [sic], benzotriazine, indolizine, quinolizine, pyridopyridine, imidazopyrimidine, pyrazinopyrimidine, carbazole, acridine, phenazine, benzoquinoline, phenoxazine, phenothiazine, acridizine, benzopteridine, phenanthroline, and phenanthrene, which, if necessary, can also be substituted.

The substitution pattern of $Ar^1$, $Ar^4$, $Ar^6$, $Ar^7$, $Ar^8$, $Ar^9$, $Ar^{10}$, and $Ar^{11}$ is thereby arbitrary; in the case of phenylene, for example, $Ar^1$, $Ar^4$, $Ar^6$, $Ar^7$, $Ar^8$, $Ar^9$, $Ar^{10}$, and $Ar^{11}$ can be ortho-, meta-, and para-phenylene. Particularly preferred groups are derived from benzene and biphenylene, which can, under certain circumstances, also be substituted.

Preferred alkyl groups are short-chain alkyl groups with 1 to 4 carbon atoms, such as methyl, ethyl, n- or i-propyl, and t-butyl groups.

Preferred aromatic groups are phenyl or naphthyl groups. The alkyl groups and the aromatic groups can be substituted.

Preferred substituents are halogen atoms such as fluorine, amino groups, hydroxy groups, or short-chain alkyl groups such as methyl or ethyl groups.

Preferred are polyazoles with recurring units of formula (I), in which the radicals X are the same within a recurring unit.

The polyazoles can basically also have different recurring units that differ, for example, in their radical X. Preferably, however, they only have the same radicals X in a recurring unit.

Other preferred polyazole polymers are polyimidazoles, polybenzthiazoles, polybenzoxazoles, polyoxadiazoles, polyquinoxalines, polythiadiazoles poly(pyridines), poyl(pyrimidines), and poly(tetrazapyrenes).

In another embodiment of the invention under consideration, the polymer containing recurring azole units is a copolymer or a blend that contains at least two units of formulas (I) to (X), which differ from one another. The polymers can be present as block copolymers (diblock, triblock), random copolymers, periodic [sic] copolymers, and/or alternating polymers.

In a particularly preferred embodiment of the invention under consideration, the polymer containing recurring azole units is a polyazole that contains only units of formula (I) and/or (II).

The number of the recurring azole units in the polymer is preferably a whole number greater than [or] equal to 10. Particularly preferred polymers contain at least 100 recurring azole units.

Within the framework of the invention under consideration, polymers containing recurring benzimidazole units are preferred. Some examples of the extremely appropriate polymers containing recurring benzimidazole units are expressed by the following formulas:

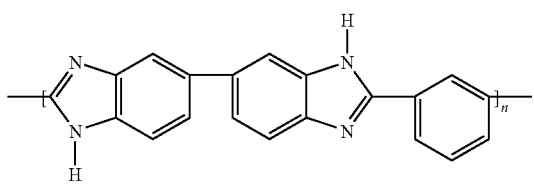 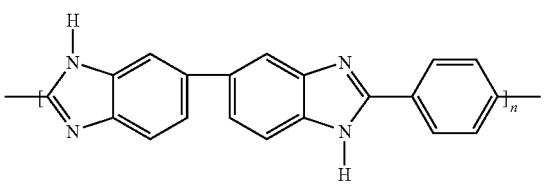

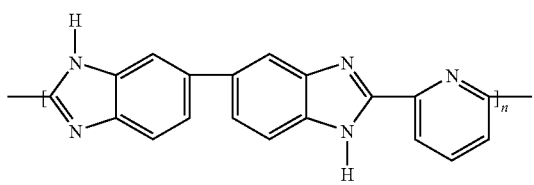 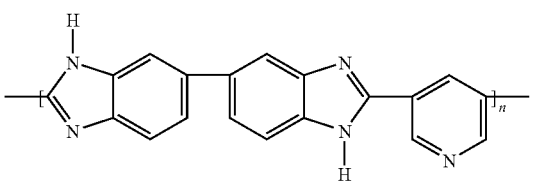

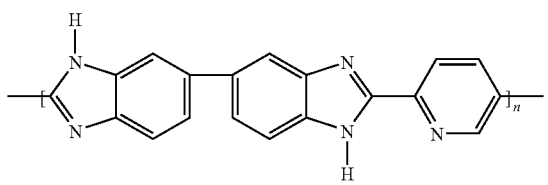 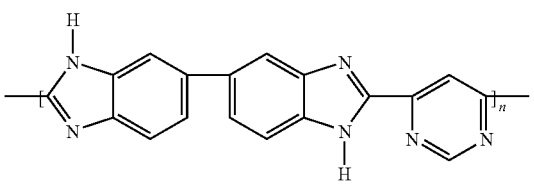

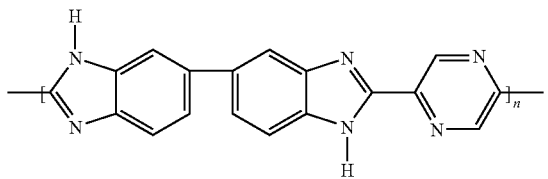 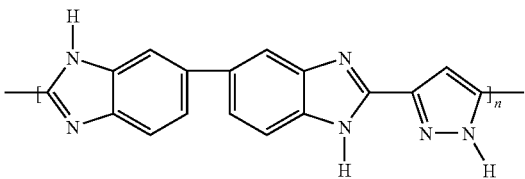

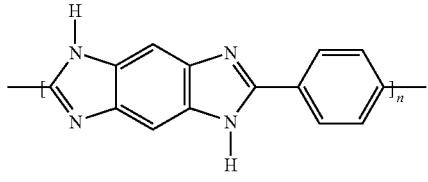 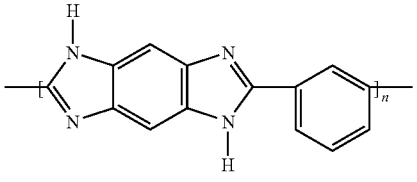

-continued

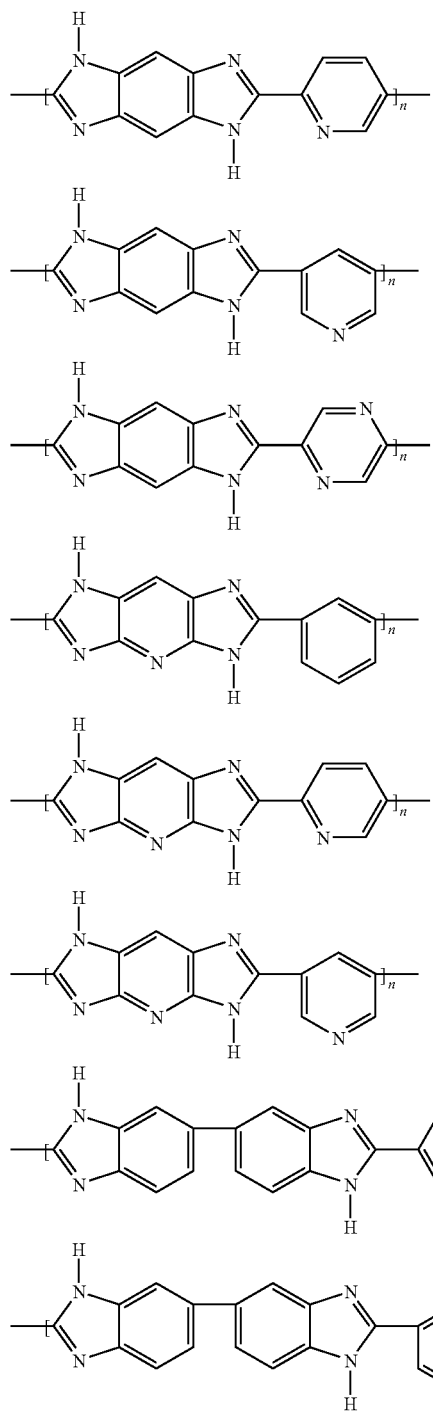
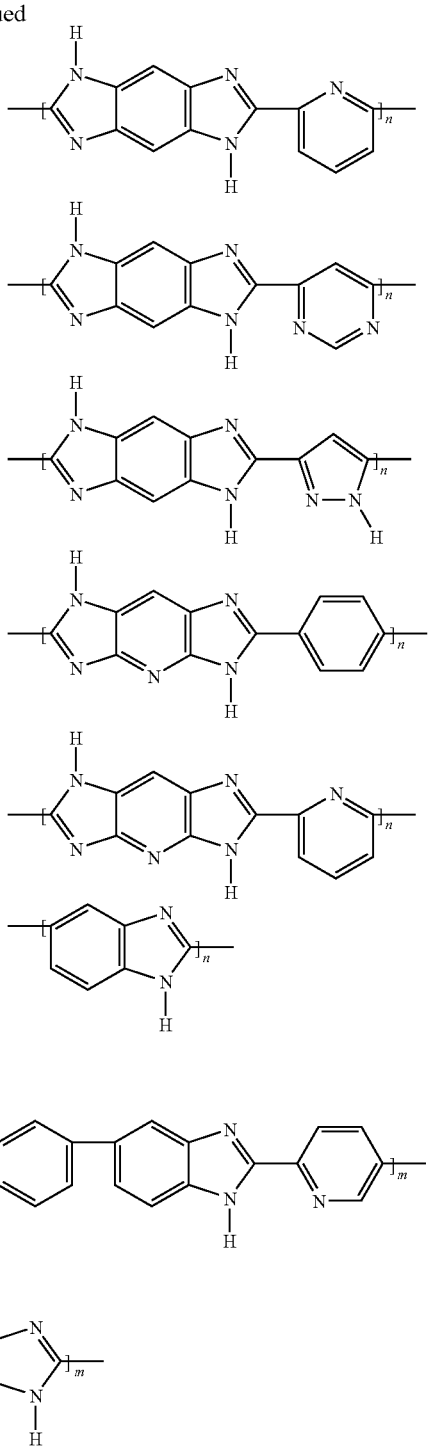

wherein n and m is a whole number greater than [or] equal to 10, preferably greater than [or] equal to 100.

The polyazoles in accordance with the invention, in particular the polyenzimidazoles, are characterized by a high molecular weight. Measured as intrinsic viscosity, it is at least 1.3 dl/g, in particular at least 1.4 dl/g, and thus is clearly above that of commercial polybenzimidazole (IV<1.1 dl/g).

The heating according to step B) takes place under an inert gas, preferably with the exclusion of moisture. The heating takes place for a period of 30 minutes to 24 hours, preferably between 1 hour and 15 hours, and in particular between 2 hours and 10 hours. For a better distribution of the heat to be introduced, it is advantageous to provide for a thorough mixing of the mass to be heated. Preferably, the mass is stirred in step B). This has an additional advantage, since the foam formation observed in the temperature range of 170 to 270° C. can be controlled or reduced. It is advantageous to select a stirrer that is suitable for bringing about, in step C), the comminution of the foam-like mass obtained in accordance with step B). The particles obtained can be comminuted further if the comminution with the available stirrer was still insufficient.

To determine the particle size and the particle size distribution, a number of measuring methods exist. Within the framework of this invention, screen analysis is sufficient for the particle size determination, so that a fractionation by screening takes place in step C).

Basically, however, all other fractionating methods that lead to a corresponding division [separation] are also suitable.

For the fractionation, in accordance with the invention, a set of screens with different mesh widths are arranged one over the other in a screening machine. In the screen analysis, the particle size is determined by the mesh width of that screen which barely allows the particle (screen passage, undersize material) to pass. The screens are represented in units of micrometers according to the inside mesh width.

In this way, the particle fraction of 300 µm to 1000 µm is separated from the remaining particles, and is subsequently used in step D). The materials used in step D) contain at least 90 wt % of the particle fraction of 300 µm to 1000 µm, preferably at least 95 wt %, and in particular at least 98 wt %.

The fractionation of the particles in step C) preferably takes place under an inert gas and with the exclusion of moisture. Should this not be possible, then a drying of the particle fraction to be processed further may be required. The residual water content of the particles used in step D) should not exceed 5 wt %, preferably 3 wt %, and in particular 1 wt %. The drying can take place by means of known methods.

Subsequently, in step D) the particle fraction of 300 µm to 100 µm is heated under an inert gas, preferably, with the exclusion of moisture, to temperatures of up to 450° C., preferably up to 400° C. The minimum temperature in step [D)] is 300° C., preferably more than 350° C. As a function of the selected temperature, the treatment time is between 15 minutes and up to 24 hours, preferably between 30 minutes and 15 hours, and in particular between 1 hour and 10 hours. To better distribute the heat to be brought in, it is advantageous to provide for a thorough mixing of the mass to be heated. Preferably, stirring is carried out in step D).

In another embodiment of the invention, step D) can be carried out in a separate reactor, and the desired partial fraction can be placed in intermediate storage as a depot substance. Preferably, step D) is carried out in a separate reactor.

In step D), the condensation to the polyazole polymer and the buildup of the high molecular weight take place.

After cooling, the molecular weight can be determined.

The polyazoles in accordance with the invention, in particular the polybenzimidazoles, are characterized by a high molecular weight. Measured as intrinsic viscosity, it is at least 1.3 dl/g, in particular at least, 1.4 dl/g, and is thus clearly above that of commercial polybenzimidazole (IV<1.1 dl/g).

As a result of the high molecular weight, the polyazoles, in accordance with the invention, are particularly good for the production of molded articles, fibers, in particular, high-strength fibers, and films in which high demands are made on the mechanical characteristics. Another advantage of the high-molecular-weight polyazole, in accordance with the invention, is to be found in the fact that it forms more stable solutions, which have an improved storage capacity.

Thus, the objective of the invention under consideration also refers to solutions of the high-molecular-weight polyazole, in accordance with the invention, in polar, aprotic solvents, particularly in dimethyl acetamide. The general production of such solutions is, for example, described in German Patent Application No. 10,052,237.8. Such solutions are suitable for the coating of surfaces, in particular metal surfaces.

Another objective of the invention under consideration refers to molded articles obtained by sintering or tempering the high-molecular-weight polyazole, in accordance with the invention, preferably by sintering or tempering in molds.

It has hereby proved advantageous if the high-molecular-weight polyazole, in accordance with the invention, exhibits a crosslinking. If, the material in accordance with this invention is used in this way, tricarboxylic acids or tetracarboxylic acids are also added in step A). In this way, the desired branching/crosslinking in the polymer, in accordance with the invention, is attained.

The tricarboxylic acids and tetracarboxylic acids or their esters, or their anhydrides or their acid chlorides, added in step A), are preferably their C1-C20-alkyl esters or C5-C12-aryl esters. Particularly preferred is 1,3,5-benzene-tricarboxylic acid (trimesic acid), 1,2-4-benzene-tricarboxylic acid (trimellitic acid), (2-carboxyphenyl)iminodiacetic acid, 3,5,3'-biphenyl tricarboxylic acid, 3,5,4'-biphenyl tricarboxylic acid, 3,5,3',5'-biphenyl tetracarboxylic acid, 1,2,4,5-benzene-tetracarboxylic acid, benzophenotetracarboxylic acid, 3,3',4,4'-biphenyl tetracarboxylic acid, 2,2',3,3'-biphenyl tetracarboxylic acid, 1,2,5,6-naphthalene-tetracarboxylic acid, or 1,4,5,8-naphthalene-tetracarboxylic acid.

The content of tricarboxylic acid or tetracarboxylic acids (relative to the used dicarboxylic acid) is between 0 and 30 mol %, preferably between 0.1 and 20 mol %, and in particular between 0.5 and 10 mol %.

Also, such high-molecular-weight polyazoles are the objective of the invention under consideration.

The films produced from the high-molecular-weight polyazole solutions, in accordance with the invention, exhibit improved material characteristics in comparison with the previously known polymer films and are suitable as separation membranes.

Such separation membranes can be produced as dense polymer films, porous hollow fiber membranes, or as porous, open-cell polymer films, optionally with a compact cover layer.

For the production of a porous membrane, a polymer solution, in accordance with the invention, can also contain a so-called pore-forming agent such as glycerol, which, depending on the selection of the composition of the precipitating agent, lead to different morphologies of the separation membranes.

For separation purposes, the following structures are preferred: i) symmetrical, porous structure; ii) asymmetrical porous structure with a polymer compression close to a membrane surface.

Scanning electron micrographs of such particularly suitable structures of polybenzimidazole membranes are disclosed in Journal of Membrane Science, Volume 20, 1984, pages 147-66.

Such phase inversion membranes and structures are known to the expert. Membranes with a symmetrical porous structure are used as separation and filtration membranes for air and gas filtration, or for micro- or ultrafiltration for liquids. Membranes with an asymmetrical, porous structure can be used in many diverse ways for reverse osmosis, in particular, water desalination, dialysis, or the preparation of gases.

A particularly appropriate use is the separation of hydrogen and carbon dioxide from gas mixtures in combination with a porous metal carrier. Alternative technologies for the $CO_2$ separation require a cooling of the gases to 150° C. because of the low thermal stability of the polymer membrane, wherein the efficiency is reduced. The separation membranes based on polyazoles, in accordance with the invention, can be operated continuously up to a temperature of 400° C. and thus lead to an increase in yield and a reduction of costs.

For additional information on separation membranes based on polyazoles, reference is made to the technical literature, in particular to the following patents: World Patent No. 98/14505; U.S. Pat. Nos. A-4,693,815; A-4,693,824; A-375,262; A-3,737,042; A-4,512,894; A-448,687; A-3,841,492. The disclosure regarding the structure and the production of separation membranes, contained in the literature references previously mentioned, is included by the invention under consideration and is a component of the description under consideration. In particular, such separation membranes can be produced in the form of flat films or as hollow fiber membranes.

To further improve the application-technical characteristics, fillers, in particular, nano-scale fillers, can be added to the polymer film.

Nonlimiting examples of such fillers are the following:
oxides: such as $Al_2O_3$, $Sb_2O_5$, $ThO_2$, $SnO_2$, $ZrO_2$, $MoO_3$
silicates: such as zeolites, zeolite($NH_4+$), layered silicates, skeletal silicates, N-natrolites,
H-mordenites, $NH_4$-analcines, $NH_4$-sodalites, $NH_4$-gallates, H-montmorillonites
fillers: such as carbides, in particular SiC, $Si_3N_4$, fibers, in particular, glass fibers, glass powders, and/or polymer fibers, preferably based on polyazoles.

As additional components, the polymer film can also contain additives that trap or destroy the radicals that may be produced, in operation, during the gas filtration.

Nonlimiting examples of such additives are the following:
bis(trifluoromethyl)nitroxide, 2,2-diphenyl-1-picrinylhydrazyl, phenols, alkyl phenols, sterically hindered alkyl phenols such as Irganox, aromatic amines, sterically hindered amines such as Chimassorb; sterically hindered hydroxyl amines, sterically hindered alkyl amines, sterically hindered hydroxyl amines, sterically hindered hydroxylamine ethers, phosphites such as Irgafos, nitrosobenzene, methyl-2-nitrosopropane, benzophenone, benzaldehyde-tert-butylnitron, cysteamine, melanines, lead oxides, manganese oxides, nickel oxides, and cobalt oxides.

Among the possible fields of application of the polymer films, in accordance with the invention, are, among others, the use as a filter medium in gas filtration and separation or gas purification, and in reverse osmosis, as substrates for flexible electrical wiring, as battery separators, as protective films for electrical cables, as insulators in electrical components and apparatuses, such as condensers, and as protective films for metal and other surfaces.

The fibers produced from the high-molecular-weight polyazole solutions, in accordance with the invention, exhibit improved material characteristics, such as strength and elastic modulus, in comparison with the previously known polymer fibers, and are suitable, in particular, for the production of high-tenacity fibers. If the fibers are to be used for textiles, they are also treated with dilute sulfuric acid at a temperature above 400° C., preferably above 450° C. The high-tenacity fibers are used as reinforcement fibers in so-called composite materials, compound materials, and fiber-reinforced molded articles, also based on the polymer.

Another objective of the invention under consideration thus refers to polymer fibers based on polyazoles whose molecular weights, expressed as intrinsic viscosity, are 1.3 dl/g, preferably at least 1.4 dl/g.

The production of these fibers takes place by means of known methods. Within the framework of the invention under consideration, a solution of the high-molecular-weight polyazole in accordance with the invention, in polar, aprotic solvents, particularly in dimethyl acetamide, is extruded by means of the methods known for PBI; subsequently, the solvent is removed with known methods.

The formed fibers can be continuous filaments or—if the fiber formation takes place analogous to the "melt blow method"—can have a staple fiber character. The titer of the formed fibers has no limitation, so that monofilaments, that is, wire-type fibers, can be produced. In addition, hollow fibers can also be produced. The desired titer is determined by the intended use of the fibers. The entire handling of the formed fibers can take place by means of known fiber technologies (see Complete Textile Glossary, Celanese Acetate LLC, 2000).

In one variant, the freshly formed, still solvent-containing fibers can be introduced into a precipitation bath. This introduction is done in the temperature range between room temperature (20° C.) and the boiling temperature of the precipitation liquid (under standard pressure).

As a precipitation liquid in the sense of the invention, solvents present as liquids at room temperature (that is, 20° C.)—selected from the group of alcohols, ketones, alkanes (aliphatic and cycloaliphatic), ethers (aliphatic and cycloaliphatic), esters, carboxylic acids, wherein the preceding [sic] group members can be halogenated, water, inorganic acids (such as $H_3PO_4$, $H_2SO_4$), and mixtures of the same—are used.

Preferably, C1-C10 alcohols, C2-C5 ketones, C1-C10-alkanes (aliphatic and cycloaliphatic), C2-C6-ethers (aliphatic and cycloaliphatic), C2-C5 esters, C1-C3 carboxylic acids, dichloromethane, water, and mixtures of the same are used.

Subsequently, the fiber is freed from the precipitation liquid. This is preferably done by drying, wherein the temperature and the ambient pressure are selected as a function of the partial vapor pressure of the precipitation liquid. Usually, the drying is done under standard pressure and at temperatures between 20° C. and 200° C. Also, more gentle drying can be carried out under vacuum. The drying method is not subject to any limitations.

The treatment in the precipitation bath can lead to the formation of porous structures, in particular, with hollow fibers. Depending on the use, these are desired for subsequent use.

As already stated before, the films produced from the high-molecular-weight polyazole solutions, in accordance with the invention, have improved material characteristics, in comparison with the previously known polymer films, and are excellent as starting materials for the production of proton-conducting membranes.

For the production of proton-conducting membranes, a film is first cast from the polymer solution, in accordance with the invention, and the solvent is removed. To this end, the measures described in German Patent Application No. 10109829.4 are preferably carried out. Subsequently, the high-molecular-weight polymer film is wetted with a doping agent and placed in it. As doping agents for the polymer membranes, in accordance with the invention, acids, preferably all known Lewis and Bronsted acids, in particular inorganic Lewis and Bronsted acids, or alkali hydroxides, are used. In addition to this previously mentioned acid, the use of polyacids is also possible, in particular isopolyacids and heteropolyacids, and mixtures of various acids. In the sense of the invention under consideration, heteropolyacids designate inorganic polyacids with at least two different central atoms, which are formed from weak, multibasic oxygen acids of a metal (preferably, Cr, Mo, V, W) and a nonmetal (preferably, As, I, P, Se, Si, Te) as partial, mixed anhydrides. Those belonging in this group are, among others, 12-molybdatophosphoric acid and 12-tungstophosphoric acid.

Doping agents that are particularly preferred in accordance with the invention are sulfuric acid, phosphoric acid, and potassium hydroxide. A very particularly preferred doping agent is phosphoric acid ($H_3PO_4$).

The polymer membranes, in accordance with the invention, are doped. Within the framework of the invention under consideration, doped polymer membranes designate those polymer membranes that exhibit an increased proton conducting capacity, in comparison with the nondoped polymer membranes, as a result of the presence of doping agents.

Method for the production of doped polymer membranes are known. In a preferred embodiment of the invention under consideration, they are obtained by wetting a film of the pertinent polymer with concentrated acid, preferably with highly concentrated phosphoric acid, over a suitable time, preferably 5 minutes to 96 hours, with particular preference 1-72 hours, at temperatures between room temperature and 100° C. and, optionally, under increased pressure.

The conducting capacity of the polymer membranes, in accordance with the invention, is affected by the degree of doping. The conducting capacity increases with an increasing concentration of doping agents, until a maximum value is attained. In accordance with the invention, the degree of doping is indicated as moles of acid per mole of repetition units of the polymer. Within the framework of the invention under consideration, a degree of doping between 3 and 15, in particular between 6 and 12, is preferred.

The polymer membrane, in accordance with the invention, has improved material characteristics in comparison with the previously known, doped polymer membranes. In particular, they have very good mechanical characteristics and, in comparison with conventional membranes, they exhibit an improved service life.

The possible application areas of the doped polymer membranes, in accordance with the invention, are, among others, the use in fuel cells, in electrolysis, in condensers, and in battery systems. As a result of their characteristics profile, the doped polymer membranes are preferably used in fuel cells.

The invention under consideration also refers to a membrane-electrode unit, which has at least a polymer membrane, in accordance with the invention. For more information regarding membrane-electrode units, reference is made to the technical literature, in particular, the following patents: U.S. Pat. Nos. A-4,191,618; A-4,212,714; and A-4,333,805. The disclosure contained in the references mentioned in the preceding (U.S. Pat. Nos. A-4,191,618; A-4,212,714; and A-4,333,805), with regard to the structure and the production of membrane-electrode units, is also a component of the description [of the invention].

For the determination of the intrinsic viscosity (IV), the polymer is first dried at 160° C. for 2 hours. 100 mg of the polymer thus dried are then dissolved in 100 mL of concentrated sulfuric acid (at least 96 wt %) at 80° C., for 4 hours. The intrinsic viscosity is determined from this solution, in accordance with ISO 3105, with an Ubbelhode viscosimeter, at a temperature of 25° C.

EXAMPLES

Example 1

214.27 g of TAB (tetra-aminobiphenyl) and 166.14 g of isophthalic acid were added, under an $N_2$ atmosphere, to a quartz reactor equipped with a stirrer. Subsequently, the mixture was heated to 150° C., while stirring, for 1 hour; to 190° C., for 1 hour; to 250° C., for 1 hour; and then to 290° C., for 1.5 hours.

A strong foam formation was observed between 190° C. and 250° C. Subsequently, the formed foam was comminuted into small particles by means of the stirrer. After another 1.5 hours, at 290° C., the reactor was cooled, then the polymer was screened into 5 fractions (<212, 212-300, 300-500, 500-1000, and >1000 µm) with a screening machine.

Table I shows the intrinsic viscosities (IV) and portions of the individual fractions. Subsequently, each individual fraction was poured into a quartz reactor and polymerized under a $N_2$ atmosphere, at 380° C., while stirring for 3 hours, then cooled, and the IV of the polymer was measured.

The IV results found for the individual polymerization are given in Table I.

TABLE I

| Particle size [µm] | Percent [%] | IV before fractionation | IV after completion of polymerization |
|---|---|---|---|
| <212 | 31.16 | 0.23 | 0.56 |
| 212-300 | 16.47 | 0.25 | 1.04 |
| 300-500 | 18.94 | 0.25 | 1.40 |
| 500-1000 | 27.38 | 0.26 | 1.44 |
| >1000 | 6.06 | 0.25 | 1.17 |

The invention claimed is:

1. A method of making a polymer based on polyazoles whose molecular weight, measured as intrinsic viscosity in a concentrated (at least 96 wt%) sulfuric acid at 25° C., is at least 1.3 dl/g*, comprising the steps of:
   A) mixing of one or more aromatic tetra-amino compounds with one or more aromatic carboxylic acids or their esters, which contain at least two acid groups per carboxylic acid monomers, or mixtures of one or more aromatic and/or heteroaromatic diaminocarboxylic acids;
   B) heating of the mixture, which can be obtained according to step B), under an inert gas, to temperatures of up to 350° C., and producing a mass;
   C) comminution of the mass obtained according to step B) and fractionation of the particles obtained;
   D) heating of the particle fraction of 300 µm to 1000 µm under an inert gas, to temperatures of up to 450° C. ; and cooling.

2. The method according to claim 1, wherein the aromatic tetra-amino compounds being selected from the group consisting of: 3,3',4,4'-tetra-aminobiphenyl, 2,3,5,6-tetra-aminopyridine, 1,2,4,5-tetra-aminobenzene, 3,3',4',4'-tetra-aminodiphenylsulfone, 3,3',4,4'-tetra-ammodiphenylether, 3,3',4,4'-tetra-aminobenzophenone, 3,3',4,4'-tetra-aminodiphenylmethane, and 3,3',4,4'tetra-aminodiphenyldimethymethane, and their salts, and their mono-, di-, tri-, and tetrahydrochloride derivatives.

3. The method according to claim 1, wherein the aromatic dicarboxylic acids being selected from the group consisting of: isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5 fluoroisophthalic acid, 2 fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-napthalenedicarboxylic acid, 2,7-naphthalenedicarboxylic acid, diphenic acid, 1,8-dihydroxynaphthalene-3,6-dicarboxylic acid, diphenyl ether4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid, or their C1-C20-alkyl esters or C5-C12-aryl esters, or their acid anhydrides, or their acid chlorides.

4. The method according to claim 1 wherein the aromatic carboxylic acids being selected from the group consisting of: tricarboxylic acids, tetracarboxylic acids, or their C1-20-alkyl esters or C5-C12-aryl esters or their acid anhydrides or their acid chlorides.

5. The method according to claim 1, wherein the aromatic carboxylic acids being selected from the group consisting of: tetracarboxylic acids, their C1-20alkyl esters or C5-C12-aryl esters or their acid anhydrides or their acid chlorides.

6. The method according to claim 4, wherein the content of tricarboxylic acids or tetracarboxylic acids (relative to the dicarboxylic acid used) is between 0 and 30 mol %.

7. The method according to claim 1, wherein the heteroaromatic carboxylic acids being selected from the group consisting of: heteroaromatic dicarboxylic acids and tricarboxylic acids and tetracarboxylic acids, which contain at least one nitrogen, oxygen, sulfur, or phosphorous atom in the ring, and their C1-20-alkyl esters or C5-C12-aryl esters, or their acid anhydrides or their acid chlorides.

8. The method according to claim 1, wherein the polymer contains recurring azole units of general formula (I) and/or (II) and/or (III) and/or (IV) and/or (V) and/or (VI) and/or (VII) and/or (VIII) and/or (IX) and/or (X),

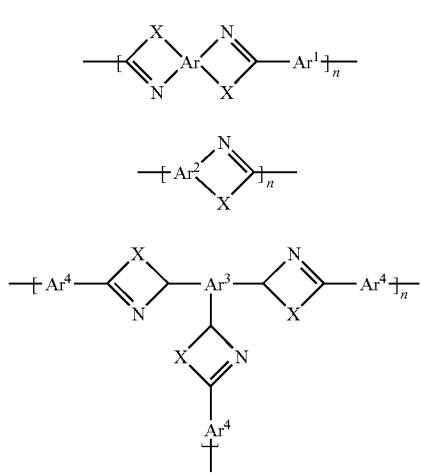

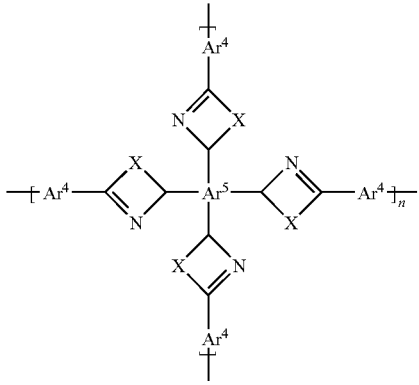

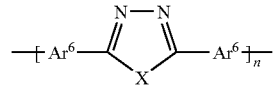

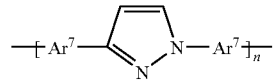

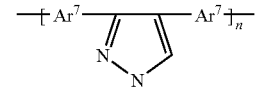

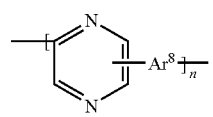

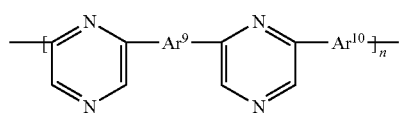

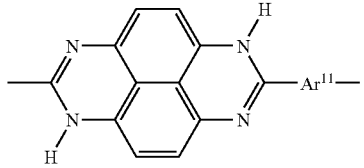

wherein,
Ar are the same or different and refers to a tetravalent, aromatic or heteroaromatic group, which can be mononuclear or multinuclear;
$Ar^1$ are the same or different and refers to a divalent aromatic or heteroaromatic group, which can be mononuclear or multinuclear;
$Ar^2$ are the same or different and refers to a divalent or trivalent aromatic or heteroaromatic group, which can be mononuclear or multinuclear;
$Ar^3$ are the same or different and refers to a trivalent aromatic or heteroaromatic group, which can be mononuclear or multinuclear;
$Ar^4$ are the same or different and refers to a trivalent aromatic or heteroaromatic group, which can be mononuclear or multinuclear;
$Ar^5$ are the same or different and refers to a tetravalent aromatic or heteroaromatic group, which can be mononuclear or multinuclear;

Ar⁶ are the same or different and refers to a divalent aromatic or heteroaromatic group, which can be mononuclear or multinuclear;

Ar⁷ are the same or different and refers to a divalent aromatic or heteroaromatic group, which can be mononuclear or multinuclear;

Ar⁸ are the same or different and refers to a trivalent aromatic or heteroaromatic group, which can be mononuclear or multinuclear;

Ar⁹ are the same or different and refers to a divalent or trivalent or tetravalent aromatic or heteroaromatic group, which can be mononuclear or multinuclear;

Ar¹⁰ are the same or different and refers to a divalent or trivalent aromatic or heteroaromatic group, which can be mononuclear or multinuclear;

Ar¹¹ are the same or different and refers to a divalent aromatic or heteroaromatic group, which can be mononuclear or multinuclear;

X is the same or different and refers to oxygen, sulfur, or an amino group, which carries a hydrogen atom, a group with 1-20 carbon atoms, or an aryl group, as an additional radical; and n is a whole number greater than or equal to 10, preferably greater than or equal to 100.

9. The method according to claim 8, wherein the polymer being selected from the group consisting of: polybenzimidazole, poly(pyridines), poly(pyrimidines), polyimidazoles, polybenzthiazoles, polybenzoxazoles, polyoxadiazoles, polyquinoxalines, polythiadiazoles, and poly(tetrazapyrenes).

10. The method according to claim 1, wherein the polymer being a polymer containing recurring benzimidazole units with the following formula:

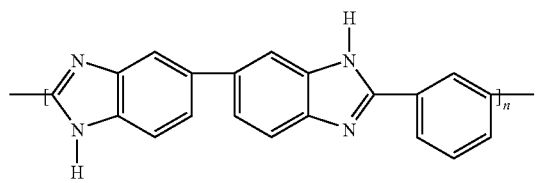
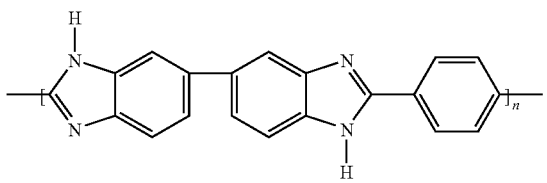
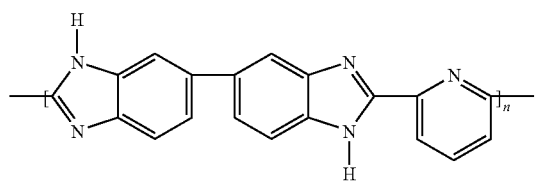
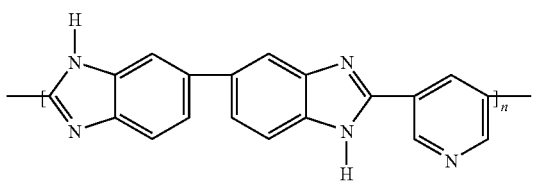
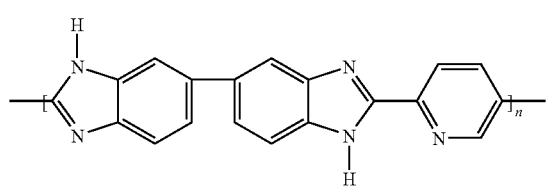
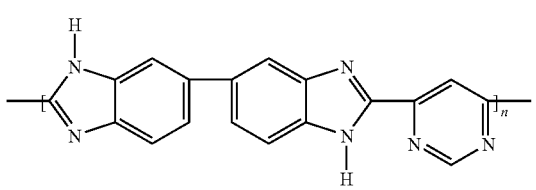
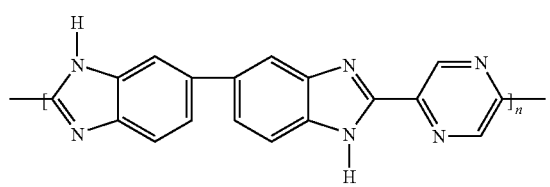
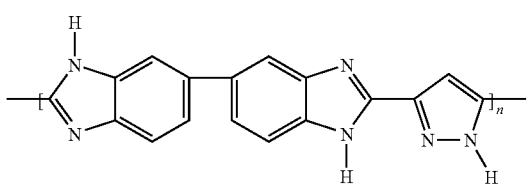
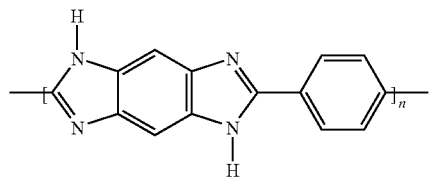
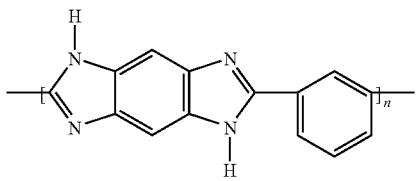
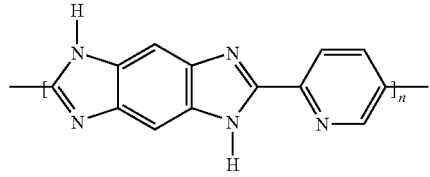
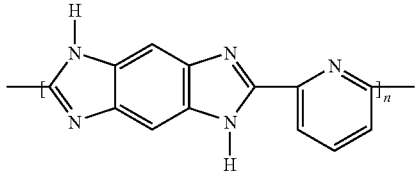

-continued

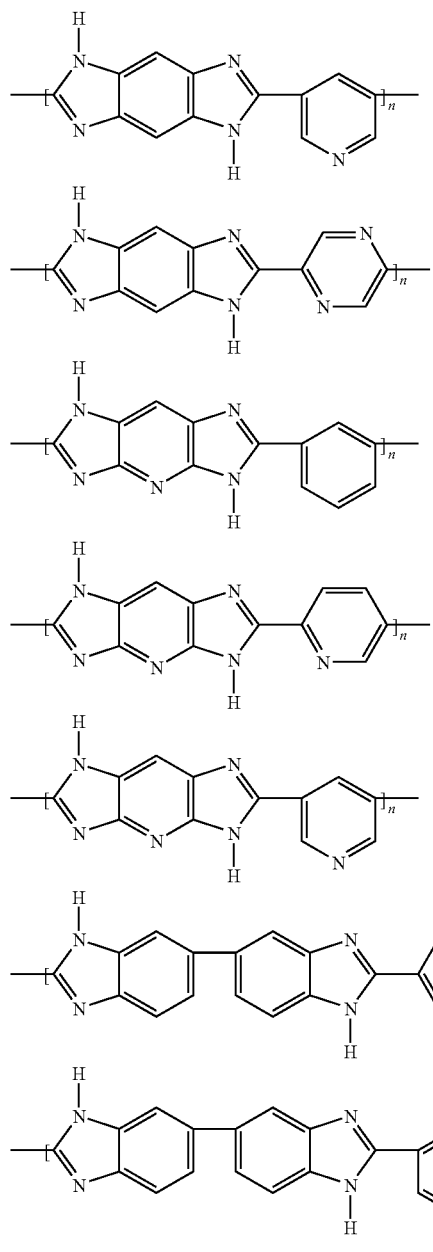
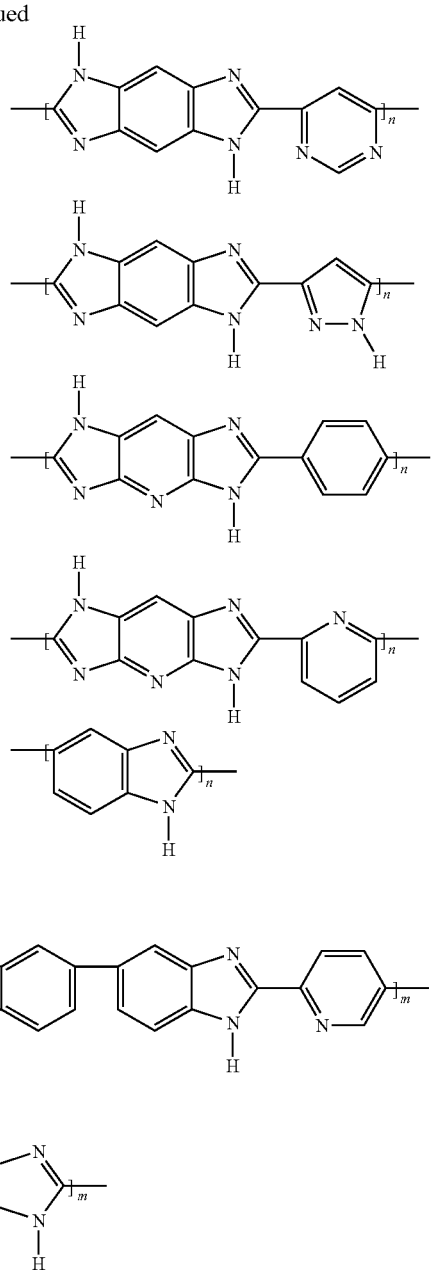

wherein n and m are whole numbers greater than or equal to 10, preferably greater than or to 100.

11. The method according to claim 1, wherein the particle fraction used in step D) contains at least 90 wt % of the particle fraction of 300 μm to 100 μm.

12. The method according to claim 6, wherein the content being between 0.5 and 10 mol%.

13. Polymer solutions containing polymers according to claim 1, dissolved in polar aprotic solvents.

14. The method according to claim 1, wherein the heating of the particle fraction to temperatures up to 400° C.

15. Molded article containing at least one polymer according to claim 1.

16. Fiber containing at least one polymer according to claim 1.

17. Film containing at least one polymer according to claim 1.

18. Coating containing at least one polymer according to claim 1.

* * * * *